US011230199B2

(12) United States Patent
Hiroe

(10) Patent No.: US 11,230,199 B2
(45) Date of Patent: Jan. 25, 2022

(54) MOTOR-DRIVEN VEHICLE AND CONTROL METHOD FOR MOTOR-DRIVEN VEHICLE

(71) Applicant: Toyota Jidosha Kabushiki Kaisha, Toyota (JP)

(72) Inventor: Yoshihiko Hiroe, Toyota (JP)

(73) Assignee: TOYOTA JIDOSHA KABUSHIKI KAISHA, Toyota Aichi-ken (JP)

(*) Notice: Subject to any disclaimer, the term of this patent is extended or adjusted under 35 U.S.C. 154(b) by 241 days.

(21) Appl. No.: 16/260,550

(22) Filed: Jan. 29, 2019

(65) Prior Publication Data

US 2019/0241085 A1 Aug. 8, 2019

(30) Foreign Application Priority Data

Feb. 6, 2018 (JP) .............................. JP2018-019590

(51) Int. Cl.
*H02J 7/02* (2016.01)
*B60L 53/22* (2019.01)
(Continued)

(52) U.S. Cl.
CPC ................ *B60L 53/22* (2019.02); *B60L 50/66* (2019.02); *B60L 53/11* (2019.02); *B60L 53/16* (2019.02);
(Continued)

(58) Field of Classification Search
CPC ......... Y02T 10/62; Y02T 10/72; Y02T 90/14; B60L 53/22; B60L 53/16; B60L 2240/527; B60L 53/14
(Continued)

(56) References Cited

U.S. PATENT DOCUMENTS 8,755,964 B2 * 6/2014 Ang .................. B60W 50/0097
701/22
9,007,001 B2 * 4/2015 Sugiyama ............... H02J 7/342
318/139
(Continued)

FOREIGN PATENT DOCUMENTS

DE 102013011104 A1 1/2015
EP 2596979 A1 5/2013
(Continued)

OTHER PUBLICATIONS

A seven switch all in one power electronic topology for converted plug-in hybrid electric vehicle; P.K. Gujarathi et al.; 2017 IEEE International Conference on Smart Technologies and Management for Computing, Communication, Controls, Energy and Materials (ICSTM); IEEE Conference Paper. (Year: 2017).*
(Continued)

*Primary Examiner* — Cuong H Nguyen
(74) *Attorney, Agent, or Firm* — Dinsmore & Shohl LLP

(57) ABSTRACT

A motor-driven vehicle includes a power storage device, a charging inlet, a voltage conversion device, a first power line connected the charging inlet and a first node, a second power line connected the charging inlet and a second node, and a switching relay configured to switch between a first state and a second state. The first state is a state in which the charging inlet is connected to the power storage device via the first power line without passing through the second power line is connected to the power storage device via the second power line without passing through the first power line.

6 Claims, 3 Drawing Sheets

(51) Int. Cl.
- B60L 53/10 (2019.01)
- B60L 50/60 (2019.01)
- B60L 53/16 (2019.01)
- *B60L 53/66* (2019.01)
- *B60L 53/14* (2019.01)

(52) U.S. Cl.
CPC ............. *B60L 53/14* (2019.02); *B60L 53/66* (2019.02); *B60L 2240/36* (2013.01); *B60L 2240/527* (2013.01); *H02J 2207/40* (2020.01)

(58) Field of Classification Search
USPC ............................................ 701/22; 320/107
See application file for complete search history.

(56) References Cited

U.S. PATENT DOCUMENTS

| | | | |
|---|---|---|---|
| 9,278,624 B2* | 3/2016 | Kinomura | B60L 53/16 |
| 2011/0169448 A1* | 7/2011 | Ichikawa | B60K 6/365 |
| | | | 320/109 |
| 2012/0133204 A1 | 5/2012 | Ang et al. | |
| 2012/0181990 A1* | 7/2012 | Asakura | B60L 53/30 |
| | | | 320/137 |
| 2012/0235639 A1* | 9/2012 | Hamauzu | B62K 11/10 |
| | | | 320/109 |
| 2013/0127413 A1 | 5/2013 | Ohtomo | |
| 2013/0307471 A1 | 11/2013 | Ichikawa et al. | |
| 2014/0002023 A1* | 1/2014 | Ichikawa | B60L 53/22 |
| | | | 320/109 |
| 2014/0028256 A1* | 1/2014 | Sugiyama | B60L 58/12 |
| | | | 320/109 |
| 2014/0091764 A1* | 4/2014 | Kinomura | B60L 53/16 |
| | | | 320/109 |
| 2014/0217972 A1* | 8/2014 | Ishii | B60L 53/53 |
| | | | 320/109 |
| 2014/0266389 A1* | 9/2014 | Sadwick | H04B 3/54 |
| | | | 327/333 |
| 2015/0183329 A1* | 7/2015 | Nakaya | B60L 50/51 |
| | | | 307/9.1 |
| 2016/0152129 A1 | 6/2016 | West et al. | |
| 2016/0214493 A1 | 7/2016 | Herke et al. | |
| 2019/0210475 A1 | 7/2019 | Pfeilschifter et al. | |
| 2019/0225107 A1* | 7/2019 | Morizono | B60L 53/66 |
| 2019/0225109 A1* | 7/2019 | Ono | B60L 3/0046 |
| 2020/0307412 A1* | 10/2020 | Moriya | B60L 50/60 |
| 2020/0336002 A1* | 10/2020 | Narla | B60L 58/12 |

FOREIGN PATENT DOCUMENTS

| | | |
|---|---|---|
| EP | 2639099 A1 | 9/2013 |
| JP | 3327631 B2 | 9/2002 |
| JP | 2009-194986 A | 8/2009 |
| JP | 2009-225568 A | 10/2009 |
| JP | 2013-038861 A | 2/2013 |
| JP | 2013-110816 A | 6/2013 |
| JP | 2013-143788 A | 7/2013 |
| JP | 2013-243844 A | 12/2013 |
| WO | 2011/024285 A1 | 3/2011 |
| WO | 2018/010948 A1 | 1/2018 |

OTHER PUBLICATIONS

An Integrated Switched Reluctance Motor Drive Topology With Voltage-Boosting and On-Board Charging Capabilities for Plug-In Hybrid Electric Vehicles (PHEVs); Mingyao Ma et al.; IEEE Access; vol. 6; IEEE Journal Article. (Year: 2018).*

Isolated DC/DC converter with three-level high-frequency link and bidirectional power flow ability for electric vehicles; Chao Zhang et al.; IET Power Electronics; vol. 12, Issue: 7; IET Journal Article. (Year: 2019).*

Converter Switching Noise Reduction for Enhancing EMC Performance in HEV and EV; HoTae Chun et al.; PCIM Europe 2016; International Exhibition and Conference for Power Electronics, Intelligent Motion, Renewable Energy and Energy Management; VDE Conference Paper. (Year: 2015).*

A survey on smart grid technologies and applications, Dileep G.; Department Electrical & Electronics Engineering, Madanapalle Institute of Technology & Science, Madanapalle, Andhra Pradesh, 517325, India (Year: 2019).*

A. Bakeer, G. Magdy, A. Chub and D. Vinnikov, "Predictive control based on ranking multi-objective optimization approach for quasi Z-source inverter," in CSEE Journal of Power and Energy Systems, doi: 10.17775/CSEEJPES.2020.01310. (Year: 2020).*

S. Rahman, I. A. Khan and M. H. Amini, "A Review on Impact Analysis of Electric Vehicle Charging on Power Distribution Systems," 2020 2nd International Conference on Smart Power & Internet Energy Systems (SPIES), 2020, pp. 420-425, doi: 10.1109/SPIES48661.2020.9243118. (Year: 2020).*

R. K. Mahto and A. Mishra, "Vector Control of Permanent Magnet Synchronous Machine with Reduced Switch Five-Level Voltage Source Inverter," 2019 IEEE 21st Electronics Packaging Technology Conference (EPTC), 2019, pp. 751-756, doi: 10.1109/EPTC47984.2019.9026670. (Year: 2019).*

* cited by examiner

MOTOR-DRIVEN VEHICLE AND CONTROL METHOD FOR MOTOR-DRIVEN VEHICLE

CROSS-REFERENCE TO RELATED APPLICATIONS

The disclosure of Japanese Patent Application No. 2018-019590 filed on Feb. 6, 2018 including the specification, drawings and abstract is incorporated herein by reference in its entirety.

BACKGROUND

1. Technical Field

The disclosure relates to a motor-driven vehicle in which a power storage device mounted in the vehicle can be charged by a power supply outside the motor-driven vehicle.

2. Description of Related Art

Recently, various measures for shortening a charging time required for charging a power storage device which is mounted in a motor-driven vehicle such as an electric vehicle and a plug-in hybrid vehicle have been taken. For example, increases in electric power of a charger (a power supply outside a motor-driven vehicle) have progressed and a plurality of chargers having different maximum outputs (for example, possible output powers and maximum output voltages) have been developed.

Japanese Unexamined Patent Application Publication No. 2013-110816 (JP 2013-110816 A) discloses a motor-driven vehicle with a configuration in which a charging inlet to which electric power supplied from a charger is applied is connected to a power storage device via a step-up/down converter. The step-up/down converter converts a voltage of electric power supplied from the charger into a voltage with which the power storage device can be charged and supplies the converted voltage into the power storage device. Accordingly, the motor-driven vehicle can cope with chargers having different maximum outputs.

SUMMARY

However, in the motor-driven vehicle disclosed in JP 2013-110816 A, since the power storage device is charged via the step-up/down converter, a loss occurs when the voltage supplied from the charging inlet is converted into a voltage with which the power storage device can be charged. Accordingly, there is concern that charging efficiency will decrease.

The disclosure is for enhancing charging efficiency of a power storage device mounted in a motor-driven vehicle.

A first aspect of the disclosure is a motor-driven vehicle. The motor-driven vehicle includes: a power storage device configured to store electric power that is supplied to an electrical load; a charging inlet configured to be supplied with electric power from an external power supply; a voltage conversion device disposed between the power storage device and the electrical load; a first power line configured to connect the charging inlet and a first node between the power storage device and the voltage conversion device; a second power line configured to connect the charging inlet and a second node between the voltage conversion device and the electrical load; and a switching relay configured to switch between a first state and a second state. The first state is a state in which the charging inlet is connected to the power storage device via the first power line without passing through the second power line. The second state is a state in which the charging inlet is connected to the power storage device via the second power line without passing through the first power line.

With this configuration, when a voltage applied from the external power supply to the charging inlet is not a voltage for charging the power storage device, the switching relay can be switched to the second state. Accordingly, the voltage applied from the external power supply to the charging inlet can be converted into a voltage with which the power storage device can be charged and be supplied to the power storage device by the voltage conversion device. On the other hand, when the voltage supplied from the external power supply to the charging inlet is a voltage with which the power storage device can be charged, the switching relay can be switched to the first state. Accordingly, the voltage applied from the external power supply to the charging inlet can be directly supplied to the power storage device without operating the voltage conversion device. Accordingly, it is possible to curb a loss due to operation of the voltage conversion device and to enhance charging efficiency of the power storage device.

The motor-driven vehicle may further include an electronic control unit configured to control the switching relay. The electronic control unit may be configured to switch the switching relay to one of the first state and the second state so as to use a maximum output of the external power supply acquired by communication from the external power supply when the charging inlet is supplied with electric power from the external power supply.

With this configuration, the switching relay can be switched to one of the first state and the second state such that a loss due to charging of the power storage device decreases depending on the maximum output of the external power supply. Accordingly, it is possible to perform charging with high charging efficiency.

In the motor-driven vehicle, the electronic control unit may be configured to switch the switching relay to the second state when a possible output voltage of the external power supply acquired by the communication from the external power supply is higher than a predetermined voltage.

When the possible output voltage of the external power supply is high and the power storage device is charged via the first power line, an excessively high voltage which is higher than the target charging voltage which is a target voltage for charging the power storage device can be applied to the power storage device. Therefore, with this configuration, the electronic control unit switches the switching relay to the second state when the possible output voltage of the external power supply is higher than the predetermined voltage. Accordingly, the voltage applied from the external power supply to the charging inlet can be stepped down to a voltage equal to or lower than the target charging voltage and supplied to the power storage device by the voltage conversion device. As a result, it is possible to charge the power storage device while preventing an excessively high voltage higher than the target charging voltage from being applied to the power storage device to protect the power storage device.

In the motor-driven vehicle, the electronic control unit may be configured to switch the switching relay to the first state when a first condition and a second condition are satisfied. The first condition may be a condition in which the possible output voltage is higher than a target charging voltage which is a target voltage for charging the power storage device. The second condition may be a condition in which the possible output voltage is lower than the predetermined voltage.

When the possible output voltage of the external power supply is higher than the target charging voltage, for example, it is conceivable to operate the voltage conversion device to step down the possible output voltage to the target charging voltage by switching the switching relay to the second state and to request the external power supply to supply electric power with the target charging voltage. When electric power supplied from the external power supply is constant and the voltage conversion device is requested to decrease the voltage applied to the charging inlet to the target charging voltage and to supply electric power, a current flowing in the charging inlet may increase depending on a decrease in the voltage. In this case, when the possible output voltage is lower than the predetermined voltage, the decrease in the voltage is small and thus an increase in the current flowing in the charging inlet is expected to be small. Accordingly, a loss due to emission of heat in the charging inlet with an increase in the current flowing in the charging inlet is expected to be smaller than a loss due to operation of the voltage conversion device by switching the switching relay to the second state. With this configuration, when the possible output voltage is higher than the target charging voltage and is lower than the predetermined voltage, the switching relay is switched to the first state. Accordingly, it is possible to curb a loss due to charging of the power storage device and to enhance charging efficiency of the power storage device.

In the motor-driven vehicle, the electronic control unit may be configured to switch the switching relay to the second state when the first condition, the second condition and a third condition are satisfied. The third condition may be a condition in which a temperature of the charging inlet is higher than a threshold value.

With this configuration, when the possible output voltage of the external power supply is higher than the target charging voltage and lower than the predetermined voltage and the temperature of the charging inlet is higher than the threshold value, the switching relay is switched to the second state. Accordingly, it is possible to supply the power storage device with a voltage to which the voltage applied from the external power supply to the charging inlet is stepped down by the voltage conversion device. Accordingly, the voltage applied from the external power supply to the charging inlet can be kept at a higher voltage in comparison with a case in which the switching relay is switched to the first state. Therefore, it is possible to decrease the current flowing in the charging inlet without decreasing electric power supplied from the external power supply. Accordingly, it is possible to curb emission of heat in the charging inlet and to enhance charging efficiency.

A second aspect of the disclosure is a control method for a motor-driven vehicle. The motor-driven vehicle includes a power storage device configured to store electric power that is supplied to an electrical load, a charging inlet configured to be supplied with electric power from an external power supply, a voltage conversion device disposed between the power storage device and the electrical load, a first power line configured to connect the charging inlet and a first node between the power storage device and the voltage conversion device, a second power line configured to connect the charging inlet and a second node between the voltage conversion device and the electrical load, a switching relay configured to switch between a first state and a second state, and an electronic control unit configured to control the switching relay. The first state is a state in which the charging inlet is connected to the power storage device via the first power line without passing through the second power line. The second state is a state in which the charging inlet is connected to the power storage device via the second power line without passing through the first power line. The control method includes switching, by the electronic control unit, the switching relay to one of the first state and the second state using a maximum output of the external power supply acquired by communication from the external power supply when the charging inlet is supplied with electric power from the external power supply.

With this configuration, when a voltage applied from the external power supply to the charging inlet is not a voltage for charging the power storage device, the switching relay can be switched to the second state. Accordingly, the voltage applied from the external power supply to the charging inlet can be converted into a voltage with which the power storage device can be charged and be supplied to the power storage device by the voltage conversion device. On the other hand, when the voltage supplied from the external power supply to the charging inlet is a voltage with which the power storage device can be charged, the switching relay can be switched to the first state. Accordingly, the voltage applied from the external power supply to the charging inlet can be directly supplied to the power storage device without operating the voltage conversion device. Accordingly, it is possible to curb a loss due to operation of the voltage conversion device and to enhance charging efficiency of the power storage device.

With the disclosure, it is possible to enhance charging efficiency of a power storage device mounted in a motor-driven vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
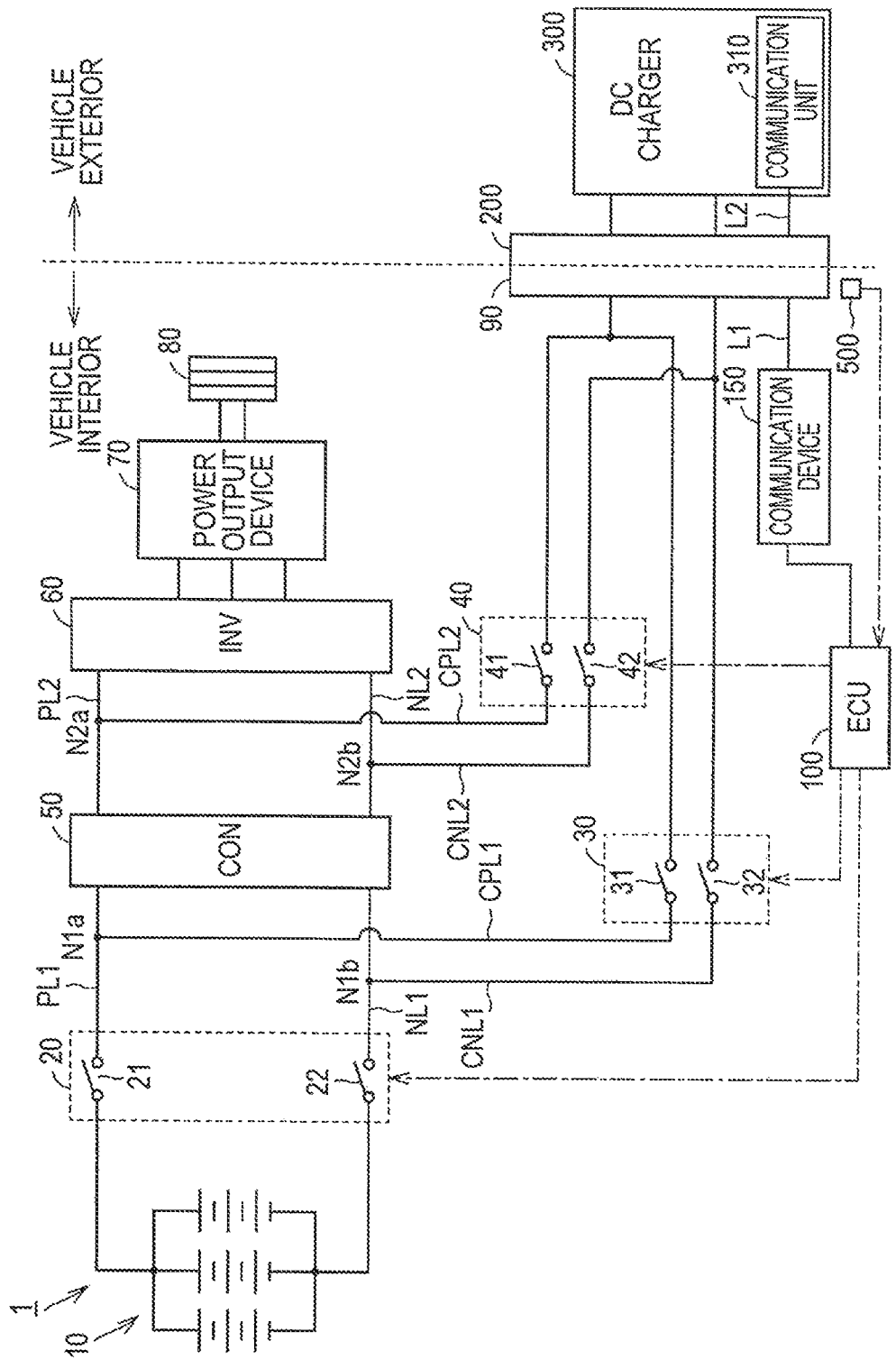
FIG. 1 is a diagram illustrating the whole configuration of a charging system including a motor-driven vehicle and a DC charger according to an embodiment.

Hereinafter, an embodiment of the disclosure will be described in detail with reference to the accompanying drawings. In the drawings, the same or corresponding elements will be referred to by the same reference signs and description thereof will not be repeated.

FIG. 1 is a diagram illustrating the whole configuration of a charging system including a motor-driven vehicle 1 and a DC charger 300 according to this embodiment.

The DC charger 300 is a charging facility that performs charging (DC charging) of supplying DC power. The DC charger 300 supplies charging power (DC) to the motor-driven vehicle 1 via a charging cable and a charging connector 200. The DC charger 300 according to this embodiment can change a supply voltage (a charging voltage) when the same power (for example, 160 kW) is supplied. For example, when the same power is supplied, the DC charger 300 can switch between supply of power at a high voltage (for example, 800 V) and supply of power at a low voltage (for example, 400 V) in response to a request from the motor-driven vehicle 1.

There are various DC chargers 300 having various maximum outputs. For example, there are a DC charger with a possible output power of 50 kW (a possible output voltage of 500 V and a possible output current of 125 A), a DC charger with a possible output power of 160 kW (a possible output voltage of 400 V and a possible output current of 400 A), and a DC charger with a possible output power of 350 kW (a possible output voltage of 1000 V and a possible output current of 400 A). A possible output power is a maximum output power value of a DC charger 300. A possible output voltage is a maximum output voltage value of a DC charger 300. A possible output current is a maximum output current value of a DC charger 300.

A DC charger 300 with a possible output power of 160 kW will be specifically described below as an example. When a power of 160 kW is supplied, the DC charger 300 supplies power with 800 V and 200 A when a target charging voltage VB which is a target voltage for charging a power storage device 10 mounted in the motor-driven vehicle 1 is 800 V, and supplies power with 400 V and 400 A when the target charging voltage VB for charging the power storage device 10 mounted in the motor-driven vehicle 1 is 400 V. In this embodiment, it is assumed that the DC charger 300 supplies power to the motor-driven vehicle 1 with a possible output power of the DC charger 300. That is, a constant power is supplied from the DC charger 300 to the motor-driven vehicle 1.

The DC charger 300 includes a communication unit 310. The communication unit 310 performs communication (hereinafter also referred to as "CAN communication") with the motor-driven vehicle 1 via a communication signal line L2, for example, based on a communication protocol such as a controller area network (CAN).

The motor-driven vehicle 1 is a motor-driven vehicle such as an electric vehicle or a plug-in hybrid vehicle. In this embodiment, it is assumed that the motor-driven vehicle 1 is a plug-in hybrid vehicle. Referring to FIG. 1, the motor-driven vehicle 1 includes a power storage device 10, a step-up/down converter 50, an inverter 60, a power output device 70, driving wheels 80, a vehicle inlet 90, an electronic control unit (ECU) 100, a communication device 150, a main relay device 20, a first charging relay device 30, a second charging relay device 40, and a temperature sensor 500.

The power storage device 10 includes three battery packs. In each battery pack, a plurality of batteries is stacked. The batteries are rechargeable DC power sources and are secondary batteries such as nickel-hydride secondary batteries or lithium-ion secondary batteries. Each battery may include a liquid electrolyte or a solid electrolyte between a positive electrode and a negative electrode. The battery packs can store electric power which is generated by the power output device 70 in addition to electric power which is supplied from the DC charger 300 and is input from the vehicle inlet 90. In this embodiment, an example in which the three battery packs are included in the power storage device 10 will be described, but the number of battery packs included in the power storage device 10 is not limited to three. The number of battery packs included in the power storage device 10 may be three or more or two or less. The battery packs are not limited to configurations in which a plurality of batteries is stacked, and may have configurations including single batteries. Large-capacity capacitors may be employed as the battery packs.

The step-up/down converter 50 performs voltage conversion between a positive electrode line PL1 and a negative electrode line NL1 and a positive electrode line PL2 and a negative electrode line NL2. Specifically, for example, the step-up/down converter 50 steps up a DC voltage supplied from the power storage device 10 and supplies the stepped-up DC voltage to the inverter 60, or steps down a DC voltage supplied from the power output device 70 via the inverter 60 and supplies the stepped-down voltage to the power storage device 10.

The step-up/down converter 50 converts (steps up or steps down) a DC voltage supplied from the DC charger 300 and supplies the converted DC voltage to the power storage device 10.

The inverter 60 converts DC power supplied from the step-up/down converter 50 into AC power and drives a motor which is included in the power output device 70. When the power storage device 10 is charged by regeneration, the inverter 60 converts AC power generated by the motor into DC power and supplies the converted DC power to the step-up/down converter 50.

The power output device 70 collectively represents devices for driving the driving wheels 80. For example, the power output device 70 includes a motor, an engine, and the like that are used to drive the driving wheels 80. By causing the motor that drives the driving wheels 80 to operate in a regeneration mode, the power output device 70 generates electric power at the time of braking of the vehicle or the like and outputs the generated electric power to the inverter 60. In the following description, the power output device 70 and the driving wheels 80 are also collectively referred to as a "drive unit." The inverter 60 and the power output device 70 serve as electrical loads of the motor-driven vehicle 1.

The vehicle inlet 90 is configured to be connectable to a charging connector 200 of the DC charger 300 that supplies DC power to the motor-driven vehicle 1. At the time of DC charging, the vehicle inlet 90 receives electric power supplied from the DC charger 300.

The main relay device 20 is disposed between the power storage device 10 and the step-up/down converter 50. The main relay device 20 includes a main relay 21 and a main relay 22. The main relay 21 and the main relay 22 are connected to the positive electrode line PL1 and the negative electrode line NL1, respectively.

When the main relays 21 and 22 are in an OFF state, electric power cannot be supplied from the power storage device 10 to the drive unit and traveling of the motor-driven vehicle 1 is not possible. When the main relays 21 and 22 are in an ON state, electric power can be supplied from the power storage device 10 to the drive unit and traveling of the motor-driven vehicle 1 becomes possible.

The first charging relay device 30 is connected between the main relay device 20 and the step-up/down converter 50. The first charging relay device 30 includes a first charging relay 31 and a first charging relay 32. One end of the first charging relay 31 is connected to a first node N1$a$ and the other end is connected to the vehicle inlet 90. One end of the first charging relay 32 is connected to a first node N1$b$ and the other end is connected to the vehicle inlet 90. The first node N1$a$ is disposed on the positive electrode line PL1 between the main relay device 20 and the step-up/down converter 50. The first node N1$b$ is disposed on the negative electrode line NL1 between the main relay device 20 and the step-up/down converter 50. The first charging relays 31 and 32 are switched to the OFF state when charging of the motor-driven vehicle 1 by the DC charger 300 is performed via first power lines CPL1 and CNL1.

By switching the main relays 21 and 22 to the ON state and switching the first charging relays 31 and 32 to the ON state, charging of the power storage device 10 using the DC charger 300 becomes possible.

The second charging relay device 40 is connected between the step-up/down converter 50 and the inverter 60. The second charging relay device 40 includes a second charging relay 41 and a second charging relay 42. One end of the second charging relay 41 is connected to a second node N2a and the other end is connected to the vehicle inlet 90. One end of the second charging relay 42 is connected to a second node N2b and the other end is connected to the vehicle inlet 90. The second node N2a is disposed on the positive electrode line PL2 between the step-up/down converter 50 and the inverter 60. The second node N2b is disposed on the negative electrode line NL2 between the step-up/down converter 50 and the inverter 60. The second charging relays 41 and 42 are switched to the OFF state when charging of the motor-driven vehicle 1 by the DC charger 300 is performed via second power lines CPL2 and CNL2.

By switching the main relays 21 and 22 to the ON state and switching the second charging relays 41 and 42 to the ON state, charging of the power storage device 10 using the DC charger 300 becomes possible.

The first charging relay device 30 and the second charging relay device 40 in this embodiment are examples of a "switching relay" in the claims.

The temperature sensor 500 detects a temperature of the vehicle inlet 90 and outputs a detected value to the ECU 100.

The communication device 150 communicates with the communication unit 310 of the DC charger 300 via a communication line L1 in accordance with a communication protocol of the CAN. Communication which is performed between the communication device 150 of the motor-driven vehicle 1 and the communication unit 310 of the DC charger 300 is not limited to CAN communication. For example, the communication which is performed between the communication device 150 of the motor-driven vehicle 1 and the communication unit 310 of the DC charger 300 may be power line communication (PLC). In this case, the communication device 150 is connected to the first power lines CPL1 and CNL1 and the second power lines CPL2 and CNL2.

Although not illustrated, the ECU 100 includes a central processing unit (CPU), a memory, and an input and output buffer, performs inputting of signals from sensors or the like and outputting of control signals to devices, and controls the devices. This control is not limited to processes based on software and may be performed by constructing dedicated hardware (an electronic circuit).

The ECU 100 controls the first charging relays 31 and 32 included in the first charging relay device 30 and the second charging relays 41 and 42 included in the second charging relay device 40 such that charging of the power storage device 10 is controlled. Specifically, when the power storage device 10 is not charged, the ECU 100 switches the first charging relays 31 and 32 and the second charging relays 41 and 42 to the OFF state (which is hereinafter also referred to as an "all-OFF state") to disconnect the vehicle inlet 90 and the power storage device 10 from each other. When the power storage device 10 is charged via the first power lines CPL1 and CNL1, the ECU 100 switches the first charging relays 31 and 32 to the ON state and switches the second charging relays 41 and 42 to the OFF state (which is hereinafter also referred to as a "first state"). When the power storage device 10 is charged via the second power lines CPL2 and CNL2, the ECU 100 switches the first charging relays 31 and 32 to the OFF state and switches the second charging relays 41 and 42 to the ON state (which is hereinafter also referred to as a "second state").

The ECU 100 controls opening and closing of the main relays 21 and 22 included in the main relay device 20. The ECU 100 performs a predetermined arithmetic operation using the temperature of the vehicle inlet 90 acquired from the temperature sensor 500 and performs various processes.

The ECU 100 transmits a charging voltage upper-limit value Vreq which is a required voltage of a voltage applied from the DC charger 300 to the vehicle inlet 90 to the DC charger 300 via the communication device 150. When the charging voltage upper-limit value Vreq is received from the motor-driven vehicle 1, the DC charger 300 supplies electric power with the charging voltage upper-limit value Vreq to the vehicle inlet 90. The charging voltage upper-limit value Vreq can be arbitrarily set within a range which is not greater than a possible output voltage VS of the DC charger 300.

The ECU 100 acquires a maximum output of the DC charger 300 from the DC charger 300 via the communication device 150. A maximum output is specifically a possible output power, a possible output voltage VS, a possible output current, or the like of the DC charger 300.

The power storage device 10 mounted in the motor-driven vehicle 1 is requested to be chargeable using DC chargers 300 having various maximum outputs. In this regard, by converting electric power applied from a DC charger 300 to the vehicle inlet 90 into a voltage with which the power storage device 10 can be charged by operating the step-up/down converter 50 via the second power lines CPL2 and CNL2 of the motor-driven vehicle 1, it is possible to charge the power storage device 10 using DC chargers 300 having various maximum outputs.

However, when the power storage device 10 is charged by voltage conversion in the step-up/down converter 50, a loss (hereinafter also referred to as a "voltage-conversion loss") due to conversion of the voltage applied from the DC charger 300 to the vehicle inlet 90 into the voltage with which the power storage device 10 can be charged by operating the step-up/down converter 50 is generated and thus there is concern that charging efficiency will decrease.

In this embodiment, since constant power is supplied from the DC charger 300 to the vehicle inlet 90, a current flowing in the vehicle inlet 90 increases when the voltage applied to the vehicle inlet 90 is decreased. When the possible output voltage VS of the DC charger 300 is higher than a target charging voltage VB of the power storage device 10, the motor-driven vehicle 1 sets the target charging voltage VB of the power storage device 10 as the charging voltage upper-limit value Vreq and transmits the set target charging voltage VB to the DC charger 300. Accordingly, the DC charger 300 supplies electric power with a voltage which is the target charging voltage VB of the power storage device 10. Accordingly, the power storage device 10 can be charged via the first power lines CPL1 and CNL1. However, in this case, the current flowing in the vehicle inlet 90 increases with a decrease in the voltage applied to the vehicle inlet 90. Accordingly, there is concern that charging efficiency will decrease due to a loss (hereinafter also referred to as a "power-transmission loss") based on an increase in heat emitted from the vehicle inlet 90, the charging cable, and the like due to the increase in the current.

Therefore, in this embodiment, when the possible output voltage VS of the DC charger 300 is higher than the target charging voltage VB of the power storage device 10 and is lower than a predetermined voltage, the voltage applied from the DC charger 300 to the vehicle inlet 90 is directly supplied to the power storage device 10 via the first power lines CPL1 and CNL1. When the possible output voltage VS of the DC charger 300 is equal to or greater than the predetermined voltage or when the possible output voltage VS of the DC charger 300 is equal to or less than the target charging voltage VB, the voltage applied from the DC charger 300 to the vehicle inlet 90 is converted by operation of the step-up/down converter 50 and is supplied to the power storage device 10 via the second power lines CPL2 and CNL2.

The predetermined voltage in this embodiment is set by adding a prescribed value to the target charging voltage VB of the power storage device 10 (predetermined voltage=VB+ prescribed value). The prescribed value is set in consideration of a power-transmission loss when electric power supplied from the DC charger 300 and the possible output voltage VS of the DC charger 300 which is higher than the target charging voltage VB and lower than the predetermined voltage (VB<VS<predetermined voltage) is decreased to the target charging voltage VB. Specifically, the prescribed value is set such that the power-transmission loss when the possible output voltage VS is higher than the target charging voltage VB and lower than the predetermined voltage and the power storage device 10 is charged via the first power lines CPL1 and CNL1 is less than the voltage-conversion loss when the power storage device 10 is charged via the second power lines CPL2 and CNL2. In other words, the prescribed value is set to a value at which the power-transmission loss when the possible output voltage VS is equal to or higher than the predetermined voltage and the power storage device 10 is charged via the first power lines CPL1 and CNL1 is greater than the voltage-conversion loss when the power storage device 10 is charged via the second power lines CPL2 and CNL2. The predetermined voltage is not limited to the above-mentioned setting and can be arbitrarily set. For example, the predetermined voltage may be set by adding an arbitrary fixed value to the target charging voltage VB.

Figure 2:
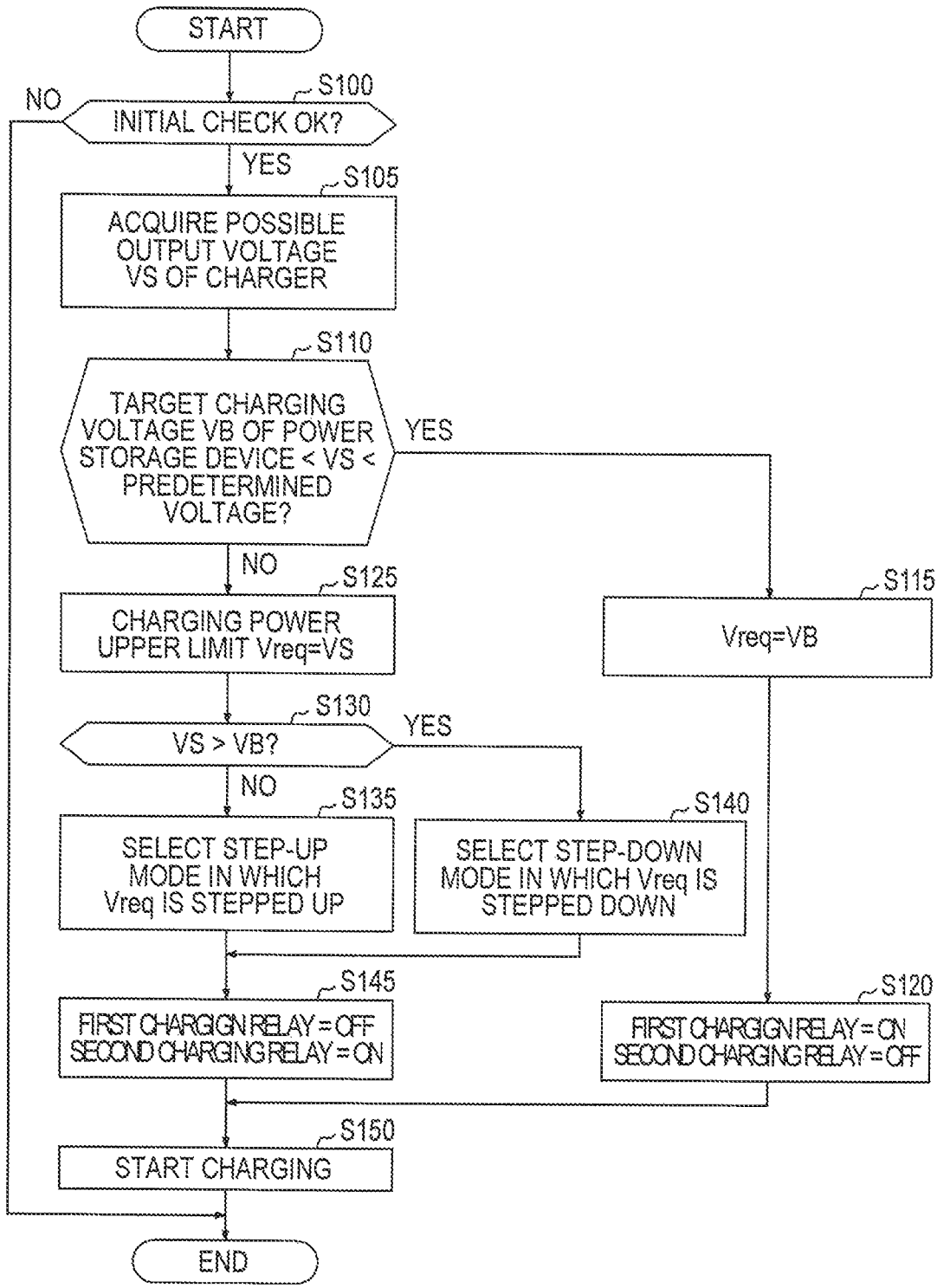
FIG. 2 is an example of a flowchart illustrating a routine which is performed by an ECU when a power storage device mounted in the motor-driven vehicle is charged.

FIG. 2 is a flowchart illustrating a routine which is performed by the ECU 100 when the power storage device 10 mounted in the motor-driven vehicle 1 is charged. This routine is performed by the ECU 100 when the charging connector 200 of the DC charger 300 is connected to the vehicle inlet 90. The steps of the flowchart illustrated in FIG. 2 are implemented by software processes of the ECU 100, but some thereof may be implemented by hardware (an electric circuit) which is incorporated into the ECU 100. The same is true of FIG. 3.

When the charging connector 200 is connected to the vehicle inlet 90, the ECU 100 starts the routine and determines whether there is an abnormality through initial check (Step 100, in which Step is hereinafter abbreviated to "S"). The initial check is to check whether charging path can be normally performed. Specifically, the initial check includes, for example, contact check between the vehicle inlet 90 and the charging connector 200 and self-checking of whether there is an electrical malfunction in the motor-driven vehicle 1.

When it is determined that there is no abnormality through the initial check (YES in S100), the ECU 100 acquires the possible output voltage VS from the DC charger 300 via the communication device 150 (S105). In this embodiment, an example in which the possible output voltage VS is acquired from the DC charger 300 is described, but information which can be acquired from the DC charger 300 is not limited to the possible output voltage VS. For example, a possible output power or a possible output current may be acquired from the DC charger 300.

The ECU 100 determines whether the possible output voltage VS is higher than the target charging voltage VB of the power storage device 10 and lower than the predetermined voltage (S110).

When it is determined that the acquired possible output voltage VS is higher than the target charging voltage VB of the power storage device 10 and lower than the predetermined voltage (YES in S110), the ECU 100 sets the charging voltage upper-limit value Vreq to the target charging voltage VB and transmits the charging voltage upper-limit value Vreq to the DC charger 300 (S115). Accordingly, the DC charger 300 supplies electric power to the vehicle inlet 90 with a voltage which is the charging voltage upper-limit value Vreq.

Then, the ECU 100 switches the first charging relays 31 and 32 to the ON state and switches the second charging relays 41 and 42 to the OFF state such that the power storage device 10 can be charged via the first power line (S120). Then, the ECU 100 starts charging of the power storage device 10 (S150).

In this way, when it is determined that charging efficiency when the power storage device 10 is charged via the first power lines CPL1 and CNL1 is higher than that when the power storage device 10 is charged via the second power lines CPL2 and CNL2 using the possible output voltage VS acquired from the DC charger 300, the ECU 100 charges the power storage device 10 via the first power lines CPL1 and CNL1. Accordingly, it is possible to enhance the charging efficiency of the power storage device 10.

When it is determined in S110 that the condition that the acquired possible output voltage VS is higher than the target charging voltage VB of the power storage device 10 and lower than the predetermined voltage has not been satisfied (NO in S110), the ECU 100 sets the charging voltage upper-limit value Vreq to the possible output voltage VS and transmits the charging voltage upper-limit value Vreq to the DC charger 300 (S125).

Subsequently, the ECU 100 determines whether the possible output voltage VS is higher than the target charging voltage VB (S130). When it is determined that the possible output voltage VS is higher than the target charging voltage VB (YES in S130), the ECU 100 selects a step-down mode in which the charging voltage upper-limit value Vreq is stepped down to the target charging voltage VB by the step-up/down converter 50 (S140). Then, the ECU 100 switches the first charging relays 31 and 32 to the OFF state and switches the second charging relays 41 and 42 to the ON state (the second state) S145). The ECU 100 steps down the charging voltage upper-limit value Vreq (=VS) to the target charging voltage VB by operation of the step-up/down converter 50 via the second power line and charges the power storage device 10 (S150).

On the other hand, when it is determined that the possible output voltage VS is not higher than the target charging voltage VB (NO in S130), the ECU 100 selects a step-up mode in which the charging voltage upper-limit value Vreq is stepped up to the target charging voltage VB (S135). Then, the ECU 100 switches the first charging relays 31 and 32 to the OFF state and switches the second charging relays 41 and 42 to the ON state (the second state) (S145). The ECU 100 steps up the charging voltage upper-limit value Vreq (=VS) to the target charging voltage VB by operation of the step-up/down converter 50 via the second power line and charges the power storage device 10 (S150).

In this way, when it is determined that charging efficiency when the power storage device 10 is charged via the second power lines CPL2 and CNL2 is higher than that when the power storage device 10 is charged via the first power lines CPL1 and CNL1 using the possible output voltage VS acquired from the DC charger 300, the ECU 100 charges the power storage device 10 via the second power lines CPL2 and CNL2. Accordingly, it is possible to enhance the charging efficiency of the power storage device 10.

When it is determined in S130 that the possible output voltage VS is higher than the target charging voltage VB, the ECU 100 steps down the charging voltage upper-limit value Vreq from the possible output voltage VS to the target charging voltage VB by operation of the step-up/down converter 50 via the second power line and charges the power storage device 10. Accordingly, it is possible to charge the power storage device 10 while preventing application of an excessive voltage to the power storage device 10.

When it is determined in Step S130 that the possible output voltage VS is not higher than the target charging voltage VB, the ECU 100 steps up the charging voltage upper-limit value Vreq from the possible output voltage VS to the target charging voltage VB by operation of the step-up/down converter 50 via the second power line and charges the power storage device 10. Accordingly, it is possible to charge the power storage device 10 with the target charging voltage VB. Accordingly, for example, even when the possible output voltage VS is higher than a current voltage of the power storage device 10 and lower than the target charging voltage VB, the power storage device 10 can be charged with the target charging voltage VB and thus it is possible to shorten the charging time required for charging of the power storage device 10 in comparison with a case in which the possible output voltage VS is not stepped up.

When it is determined in S100 that there is an abnormality through the initial check (NO in S100), the ECU 100 ends the routine.

As described above, in this embodiment, the ECU 100 determines via which of the first power lines CPL1 and CNL1 and the second power lines CPL2 and CNL2 the power storage device 10 is to be charged using the possible output voltage VS of the DC charger 300 acquired from the DC charger 300 by communication. When it is determined that the possible output voltage VS is higher than the target charging voltage VB of the power storage device 10 and lower than the predetermined voltage, the power storage device 10 is charged via the first power lines CPL1 and CNL1. Accordingly, it is possible to curb a loss due to conversion of a voltage by operation of the step-up/down converter 50 and to enhance the charging efficiency of the power storage device 10.

On the other hand, when it is determined that the possible output voltage VS is equal to or higher than the predetermined voltage, the power storage device 10 is charged via the second power lines CPL2 and CNL2. Accordingly, the charging voltage upper-limit value Vreq can be stepped down by operation of the step-up/down converter 50 and the power storage device 10 can be charged. Therefore, it is possible to charge the power storage device 10 while preventing application of an excessive voltage to the power storage device 10.

When it is determined that possible output voltage VS is equal to or lower than the target charging voltage VB, the power storage device 10 is charged via the second power lines CPL2 and CNL2. Accordingly, the charging voltage upper-limit value Vreq can be stepped up by operation of the step-up/down converter 50 and the power storage device 10 can be charged. Therefore, it is possible to charge the power storage device 10 with the target charging voltage VB.

In this embodiment, the ECU 100 determines which of the first power lines CPL1 and CNL1 and the second power lines CPL2 and CNL2 should be used to charge the power storage device 10 using the possible output voltage VS of the DC charger 300. The ECU 100 may determine which of the first power lines CPL1 and CNL1 and the second power lines CPL2 and CNL2 should be used to charge the power storage device 10 using the temperature T1 of the vehicle inlet 90 in addition to the possible output voltage VS of the DC charger 300.

For example, when the DC charger 300 was used to charge another motor-driven vehicle before the motor-driven vehicle 1 is charged, it is conceivable that the charging connector 200 of the DC charger 300 be at a very high temperature. In this case, when the charging connector 200 is connected to the vehicle inlet 90, the vehicle inlet 90 may also become a high temperature by thermal conduction. When a large charging current flows in the vehicle inlet 90 in this state, the vehicle inlet 90 may further emit heat and thus there is a likelihood that the power-transmission loss will increase.

Therefore, when the possible output voltage VS is higher than the target charging voltage VB of the power storage device 10 and lower than the predetermined voltage (VB<VS<predetermined voltage) and the temperature T1 of the vehicle inlet 90 is higher than a threshold value Tth, the power storage device 10 is charged via the second power lines CPL2 and CNL2.

Accordingly, when the temperature T1 of the vehicle inlet 90 is equal to or greater than the threshold value Tth, the power storage device 10 is charged via the second power lines CPL2 and CNL2 and thus a voltage which is higher than the target charging voltage VB of the power storage device 10 can be applied from the DC charger 300 to the vehicle inlet 90. Accordingly, since the current flowing in the vehicle inlet 90 can be decreased, it is possible to curb emission of heat from the vehicle inlet 90 and to enhance the charging efficiency.

The threshold value Tth in the modified example is arbitrarily set in consideration of the power-transmission loss when the power storage device 10 is charged via the first power line and the voltage-conversion loss when the power storage device 10 is charged via the second power line. For example, the threshold value Tth is set to a value at which the power-transmission loss when the power storage device 10 is charged via the first power line in a case in which the temperature T1 of the vehicle inlet 90 is equal to or higher than the threshold value Tth is greater than the voltage-conversion loss when the power storage device 10 is charged via the second power line. In other words, the threshold value Tth is set to a value at which the power-transmission loss when the power storage device 10 is charged via the first power line in a case in which the temperature T1 of the vehicle inlet 90 is lower than the threshold value Tth is less than the voltage-conversion loss when the power storage device 10 is charged via the second power line.

Figure 3:
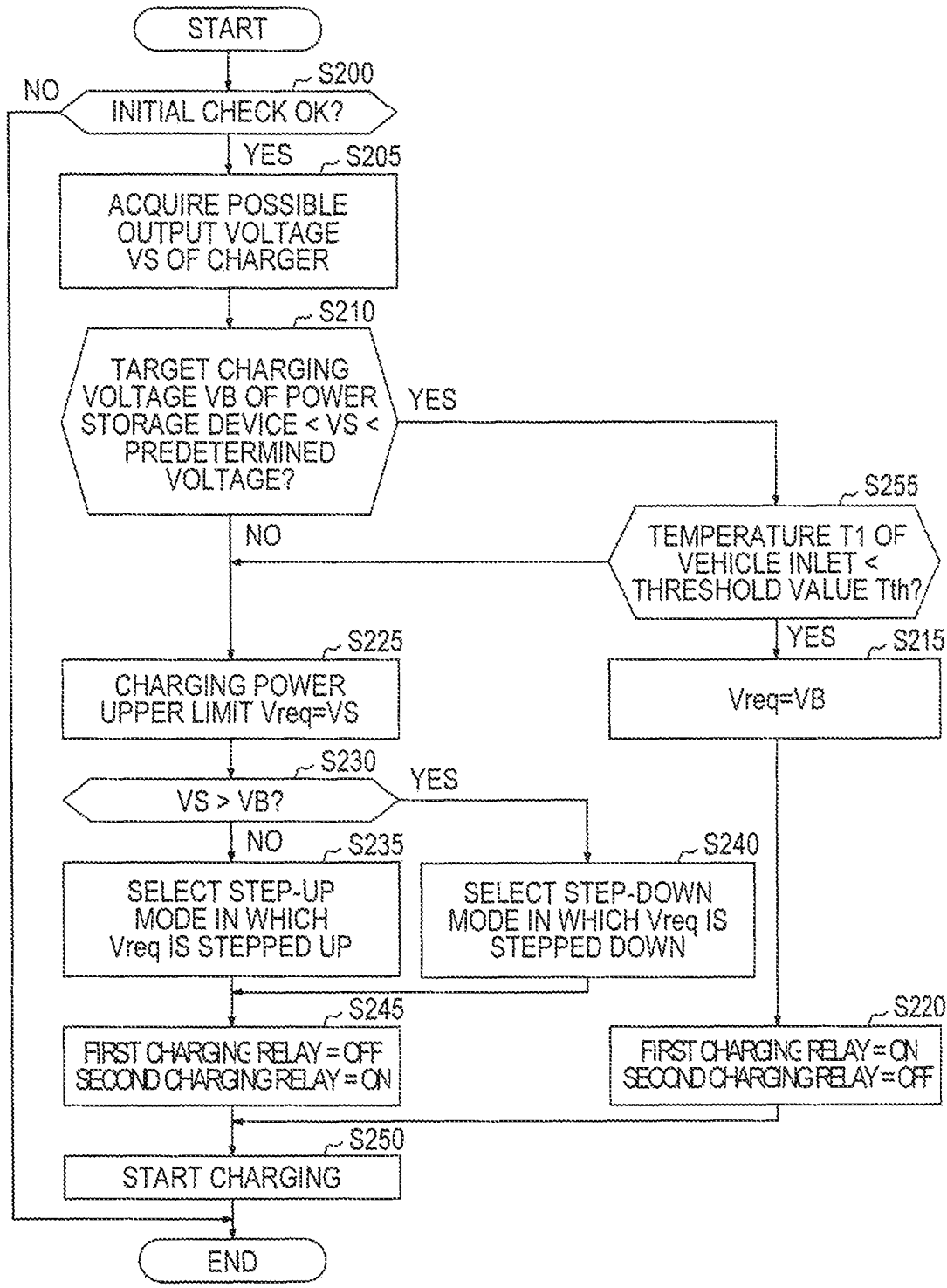
FIG. 3 is another example of a flowchart illustrating a routine which is performed by the ECU when the power storage device mounted in the motor-driven vehicle is charged.

FIG. 3 is a flowchart illustrating a routine which is performed by the ECU 100 when the power storage device 10 mounted in the motor-driven vehicle 1 is charged. In the flowchart illustrated in FIG. 3, S255 is added to the flowchart illustrated in FIG. 2. The other steps are the same as the steps in the flowchart illustrated in FIG. 2 and thus description thereof will not be repeated.

When it is determined that the possible output voltage VS is higher than the target charging voltage VB of the power storage device 10 and lower than the predetermined voltage (YES in S210), the ECU 100 determines whether the temperature T1 of the vehicle inlet 90 is lower than the threshold value Tth (S255).

When it is determined that the temperature T1 of the vehicle inlet 90 is lower than the threshold value Tth (YES in S255), the ECU 100 sets the charging voltage upper-limit value Vreq to the target charging voltage VB and transmits the charging voltage upper-limit value Vreq to the DC charger 300 (S215). Then, then ECU 100 switches the first charging relays 31 and 32 to the ON state and switches the second charging relays 41 and 42 to the OFF state such that the power storage device 10 can be charged via the first power line (S220). Then, the ECU 100 starts charging of the power storage device 10 (S250).

When it is determined that the temperature T1 of the vehicle inlet 90 is not lower than the threshold value Tth (NO in S255), the ECU 100 sets the charging voltage upper-limit value Vreq to the possible output voltage VS and transmits the charging voltage upper-limit value Vreq to the DC charger 300 (S225).

In this case, since the possible output voltage VS is higher than the target charging voltage VB, the ECU 100 determines that the possible output voltage VS is higher than the target charging voltage VB in S230 (YES in S230) and selects the step-down mode in which the charging voltage upper-limit value Vreq (=VS) is stepped down to the target charging voltage VB (S240). The ECU 100 switches the first charging relays 31 and 32 to the OFF state and switches the second charging relays 41 and 42 to the ON state (the second state) S245. The ECU 100 steps down the charging voltage upper-limit value Vreq (=VS) to the target charging voltage VB by operation of the step-up/down converter 50 via the second power line and charges the power storage device 10 (S250).

As described above, when the possible output voltage VS is higher than the target charging voltage VB of the power storage device 10 and lower than the predetermined voltage (VB<VS<predetermined voltage) and the temperature T1 of the vehicle inlet 90 is equal to or higher than the threshold value Tth, the power storage device 10 is charged via the second power lines CPL2 and CNL2.

Accordingly, when the temperature T1 of the vehicle inlet 90 is equal to or higher than the threshold value Tth, a voltage of the power supplied from the DC charger 300 is stepped down by operation of the step-up/down converter 50 and is supplied to the power storage device 10 via the second power lines CPL2 and CNL2 and thus a voltage higher than the target charging voltage VB of the power storage device 10 can be applied from the DC charger 300. Accordingly, since the current flowing in the vehicle inlet 90 can be decreased, it is possible to curb emission of heat from the vehicle inlet 90 and to enhance the charging efficiency.

It should be understood that the embodiment disclosed herein is exemplary in all respects but is not restrictive. The scope of the disclosure is not limited to description of the above-mentioned embodiment but is defined by the appended claims, and is intended to include all modifications within meanings and scopes equivalent to the claims.

What is claimed is:

1. A motor-driven vehicle comprising:
   a power storage device configured to store electric power that is supplied to an electrical load;
   a charging inlet configured to be supplied with electric power from an external power supply;
   a voltage conversion device disposed between the power storage device and an inverter;
   the inverter disposed between the voltage conversion device and the electrical load;
   a first power line configured to connect the charging inlet and a first node between the power storage device and the voltage conversion device;
   a second power line configured to connect the charging inlet and a second node between the voltage conversion device and the inverter; and
   a switching relay configured to switch between a first state and a second state,
   the first state being a state in which the charging inlet is connected to the power storage device via the first power line without passing through the second power line, and the second state being a state in which the charging inlet is connected to the power storage device via the second power line without passing through the first power line.

2. The motor-driven vehicle according to claim 1, further comprising
   an electronic control unit configured to control the switching relay,
   wherein the electronic control unit is configured to switch the switching relay to one of the first state and the second state so as to use a maximum output of the external power supply acquired by communication from the external power supply when the charging inlet is supplied with electric power from the external power supply.

3. The motor-driven vehicle according to claim 2, wherein the electronic control unit is configured to switch the switching relay to the second state when a possible output voltage of the external power supply acquired by the communication from the external power supply is higher than a predetermined voltage.

4. The motor-driven vehicle according to claim 3, wherein the electronic control unit is configured to switch the switching relay to the first state when a first condition and a second condition are satisfied, the first condition is a condition in which the possible output voltage is higher than a target charging voltage that is a target voltage for charging the power storage device, and the second condition is a condition in which the possible output voltage is lower than the predetermined voltage.

5. The motor-driven vehicle according to claim 4, wherein the electronic control unit is configured to switch the switching relay to the second state when the first condition, the second condition and a third condition are satisfied, the third condition is a condition in which a temperature of the charging inlet is higher than a threshold value.

6. A control method for a motor-driven vehicle,
   the motor-driven vehicle including a power storage device configured to store electric power that is supplied to an electrical load, a charging inlet configured to be supplied with electric power from an external power supply, a voltage conversion device disposed between the power storage device and an inverter, the inverter disposed between the voltage conversion device and the electrical load, a first power line configured to connect the charging inlet and a first node between the power storage device and the voltage conversion device, a second power line configured to connect the charging inlet and a second node between the voltage conversion device and the inverter, a switching relay configured to switch between a first state and a second state, and an electronic control unit configured to control the switching relay, the first state being a state in which the charging inlet is connected to the power storage device via the first power line without passing through the second power line, the second state being a state in which the charging inlet is connected to the power storage device via the second power line without passing through the first power line,
the control method comprising:
  switching, by the electronic control unit, the switching relay to one of the first state and the second state using a maximum output of the external power supply acquired by communication from the external power supply when the charging inlet is supplied with electric power from the external power supply.

* * * * *